(12) United States Patent
Busropan et al.

(10) Patent No.: US 10,419,910 B2
(45) Date of Patent: Sep. 17, 2019

(54) TELECOMMUNICATIONS NETWORK AND METHOD OF TRANSFERRING USER DATA IN SIGNALLING MESSAGES FROM A COMMUNICATION UNIT TO A DATA PROCESSING CENTRE

(71) Applicants: Koninklijke KPN N.V., The Hague (NL); Nederlandse Organisatie Voor Toegepast-Natuurwetenschappelijk Onderzoek TNO, s-Gravenhage (NL)

(72) Inventors: Bryan Jerrel Busropan, The Hague (NL); Johannes Maria Van Loon, Zoetermeer (NL)

(73) Assignees: Koninklijke KPN N.V., Rotterdam (NL); Nederlandse Organisatie voor Toegepast-Natuurwetenschappelijk Onderzoek TNO, 's-Gravenhage (NL)

( * ) Notice: Subject to any disclaimer, the term of this patent is extended or adjusted under 35 U.S.C. 154(b) by 405 days.

(21) Appl. No.: 15/176,357

(22) Filed: Jun. 8, 2016

(65) Prior Publication Data

US 2016/0286336 A1  Sep. 29, 2016

Related U.S. Application Data

(63) Continuation of application No. 13/126,601, filed as application No. PCT/EP2009/064185 on Oct. 28, 2009, now Pat. No. 9,372,098.

(30) Foreign Application Priority Data

Oct. 28, 2008  (EP) .................................... 08018761

(51) Int. Cl.
*H04W 4/70* (2018.01)
*G01D 4/00* (2006.01)
(Continued)

(52) U.S. Cl.
CPC .............. *H04W 4/70* (2018.02); *G01D 4/002* (2013.01); *H04L 67/02* (2013.01); *H04W 4/20* (2013.01);
(Continued)

(58) Field of Classification Search
CPC ...................................................... H04W 4/70
See application file for complete search history.

(56) References Cited

U.S. PATENT DOCUMENTS

2004/0147266 A1  7/2004  Hwang et al.
2004/0192251 A1  9/2004  Zhao et al.
(Continued)

FOREIGN PATENT DOCUMENTS

EP  0805609  11/1997
EP  2129095  12/2009
(Continued)

OTHER PUBLICATIONS

International Search Report and Written Opinion, PCT International Application No. PCT/EP2009/064185 dated Nov. 23, 2009.
(Continued)

*Primary Examiner* — Ankur Jain
(74) *Attorney, Agent, or Firm* — McDonnell Boehnen Hulbert & Berghoff LLP

(57) ABSTRACT

The invention relates to a system and method of transferring user data from a communication module to a data processing center over a telecommunications network. A signalling message is wirelessly received from the communication module in the telecommunications network. The signalling message contains the user data that is subsequently transferred to the data processing center. By inserting the user data in the signalling message(s), it is possible to rapidly transmit data to the telecommunications network, while resources can be saved since it not required to establish a
(Continued)

complete circuit-switched or packet switched connection between the communication module and the telecommunications network. The user data may comprise application data of a program run by the communication module, e.g. alarming data, measurement data or derivatives thereof.

29 Claims, 6 Drawing Sheets

(51) Int. Cl.
  *H04W 4/20* (2018.01)
  *H04L 29/08* (2006.01)
  *H04W 4/14* (2009.01)
(52) U.S. Cl.
  CPC ............. *H04W 4/14* (2013.01); *Y02B 90/241* (2013.01); *Y02B 90/246* (2013.01); *Y04S 20/32* (2013.01); *Y04S 20/42* (2013.01)

(56) References Cited

U.S. PATENT DOCUMENTS

| | | | |
|---|---|---|---|
| 2005/0083197 | A1 | 4/2005 | Glenn et al. |
| 2006/0262742 | A1* | 11/2006 | Dommaraju .......... H04L 43/028 370/328 |
| 2007/0232306 | A1* | 10/2007 | Johannesson ......... H04W 48/18 455/435.2 |
| 2008/0220772 | A1 | 9/2008 | Islam et al. |
| 2010/0203898 | A1 | 8/2010 | Noldus et al. |
| 2010/0322162 | A1 | 12/2010 | Krco et al. |

FOREIGN PATENT DOCUMENTS

| | | |
|---|---|---|
| WO | WO2005/091661 | 9/2005 |
| WO | WO2008/051716 | 5/2008 |

OTHER PUBLICATIONS

European Search Report, European Patent Application 08018761.0 dated Apr. 16, 2009.

Digital cellular telecommunications system (Phase 2+); Universal Mobile Telecommunications System (UMTS); Mobile Radio Interface Layer 3 Specification; Core network protocols; Stage 3 (3GPP TS 24.008 version 8.3.0 Release 8) ETSI TS 124 008 V8.3.0 (Oct. 2008), 557 pages.
Digital cellular telecommunications system (Phase 2+); Mobile Switching Centre—Base Station system (MSC-BSS) Interface Layer 3 Specification (3GPP TS 48.008 version 4.10.0 Release 4), ETSI TS 148 008 V4.10.0 (Sep. 2003), 140 pages.
"Digital cellular telecommunications system (Phase 2+); General Packet Radio Service (GPRS); Base Station System (BSS)— Serving GPRS Support Node (SGSN) Interface; GB Interface Layer 1 (3GPP TS 48.014 version 4.0.0 Release 4)," ETSI TS 148 014 V4.0.0 (Apr. 2001), 10 pages.
"Digital cellular telecommunications system (Phase 2+); General Packet Radio Service (GPRS); Base Station System (BSS)— Serving GPRS Support Node (SGSN) Interface; Network Service (3GPP TS 48.016 version 6.4.0 Release 6)," ETSI TS 148 016 V6.4.0 (Jul. 2005), 60 pages.
"Digital cellular telecommunications system (Phase 2+); General Packet Radio Service (GPRS); Base Station system (BSS)— Serving GPRS Support Node (SGSN); BSS GPRS protocol (BSSGP) (3GPP TS 48.018 version 7.13.0 Release 7)," ETSI TS 148 018 V7.13.0 (Feb. 2010), 173 pages.
"Universal Mobile Telecommunications System (UMTS); UTRAN lu interface: General aspects and principles (3GPP TS 25.410 version 6.4.0 Release 6)," ETSI TS 125 410 V6.4.0 (Sep. 2005), 29 pages.
"Universal Mobile Telecommunications System (UMTS); UTRAN lu interface layer 1 (3GPP TS 25.411 version 6.0.0 Release 6)," ETSI TS 125 411 V6.0.0 (Dec. 2003), 11 pages.
"Universal Mobile Telecommunications System (UMTS); UTRAN lu interface Signalling Transport (3GPP TS 25.412 version 3.5.0 Release 1999)," ETSI TS 125 412 V3.5.0 (Sep. 2000), 11 pages.
"Universal Mobile Telecommunications System (UMTS); UTRAN lu Interface RANAP Signalling (3GPP TS 25.413 version 3.4.0 Release 1999)," ETSI TS 125 413 V3.4.0 (Dec. 2000), 182 pages.
"Universal Mobile Telecommunications System *UMTS); UTRAN lu Interface Data transport and Transport Signalling (3G TS 25.414 version 3.2.0 Release 1999)," ETSI TS 125 414 V3.2.0 (Jan. 2000), 11 pages.

* cited by examiner

TELECOMMUNICATIONS NETWORK AND METHOD OF TRANSFERRING USER DATA IN SIGNALLING MESSAGES FROM A COMMUNICATION UNIT TO A DATA PROCESSING CENTRE

CROSS REFERENCE TO RELATED APPLICATIONS

The present application is a continuation of, and claims priority to, U.S. application Ser. No. 13/126,601, filed on Apr. 28, 2011, which is a national stage entry of, and claims priority to, International Patent Application No. PCT/EP2009/064185 filed Oct. 28, 2009, which claims priority to European Patent Application No. 08018761.0 filed Oct. 28, 2008, all three of which are hereby incorporated in their entirety herein by reference.

FIELD OF THE INVENTION

Generally, the invention relates to the field of data transfer over a telecommunications network. More specifically, the invention relates to a telecommunications network and a method of transferring user data from a communication module to a data processing centre in a machine-to-machine communications setting.

BACKGROUND OF THE INVENTION

The past decades have shown an ever increasing demand for data capacity of telecommunications networks. Telecommunications providers have adapted their networks to provide extended services to meet the demands of their clients.

One example of such services relates to the field of machine-to-machine (M2M) communications. M2M applications typically involve hundreds or thousands of communication modules that only rarely require access to a telecommunications network. An example involves the electronic reading of e.g. electricity meters at the homes of a large customer base. Other examples include sensors, meters, coffee machines etc that can be equipped with communication modules that allow for reporting status information to a data processing centre over the telecommunications network. The data processing centre may e.g. store the data and/or provide a schedule for maintenance people to repair a machine, meter, sensor etc.

M2M communication systems are typically characterized by the fact that, most of the time, the communication modules have nothing or only a limited amount of data to report. However, for some applications or in some situations, such as alarming, it is required that data can rapidly be sent from a communication module to a data processing centre, e.g. within seconds.

SUMMARY OF THE INVENTION

It is an object of the present invention to provide a method and telecommunications network that allow for efficient and fast communications of limited amounts of data in a machine-to-machine environment.

An aspect of the invention involves a method of transferring user data from a communication module to a data processing centre over a telecommunications network. A signalling message is wirelessly received from the communication module in the telecommunications network. The signalling message contains the user data that is subsequently transferred to the data processing centre.

Other aspects of the invention relate to a computer program, a telecommunications network and a node of such a network configured for performing the steps of the method as defined in the claims.

Another aspect of the invention involves a communication module comprising a processor for processing user data, an encapsulation module configured for encapsulating the user data in one or more signalling messages from the communication module to the telecommunications network and a transmitter for transmitting the signalling messages containing the user data to said telecommunications network.

By inserting the user data in the signalling message(s), it is possible to rapidly transmit data to the telecommunications network, while resources can be saved since it is not required to establish a complete circuit-switched or packet-switched connection between the communication module and the telecommunications network. The user data may comprise application data of a program run by the communication module, e.g. alarming data, measurement data or derivatives thereof.

Although, in principle, it is possible to transmit a copy of the signalling message(s) to the data processing centre, in an embodiment of the invention, the user data is retrieved from the signalling message(s) in the telecommunications network and is then transferred to the data processing centre. This is efficiently performed in the core network of the telecommunications network, e.g. in the mobile switching centre (MSC) or a serving GPRS support node (SGSN), since the signalling messages terminate at such nodes. It is also possible that a monitoring module is provided between the radio access network and the core network that is configured for sniffing signalling messages to recognize signalling messages carrying user data.

In an embodiment of the invention, the signalling message carrying the user data is a network attach request message. The attach message than has an information element for the user data. This information element may be a new information element or an existing information element that is not used in a particular situation. As an example, if the IMEI information element is not required, this information element may be used for the user data.

The attach message is typically one of the first messages received from the communication module in the telecommunications network and, therefore, provides an appropriate instance for rapidly receiving the user data. For circuit switched applications, the network attach request message may be a location updating request message with a location updating type information element indicating an IMSI attach. For packet-switched applications, the network attach request message may be an attach request with an attach type information element indicating a GPRS request or a combined GPRS/IMSI attach. These specific instances of network attach request messages typically occur when a communication device is powered on and allow for efficient implementation within the standard 3GPP TS 24.008, Version 8.3.0. Furthermore, the use of attach messages for transferring the user data allows to use communication modules not possessing a smart identity module (SIM).

In an embodiment of the invention, the telecommunications network may accept the network attach request message after which a connection can be established. This allows for further data to be sent to or from the communication module. As an example, a confirmation may be received that the user data has been delivered to the data processing centre, thereby e.g. allowing the communication module to return to a sleep mode, to refrain from attempting to transmit the same user data again or to delete the user data. The further data may also include additional information for the data processing centre. If no further data are to be transmitted, the communication module informs the telecommunications network that it desires to detach from the network. Of course, after being detached, the further data may also be transmitted from the communication module in further attach requests.

In an embodiment of the invention, the attach request message from the communication module is rejected by the network, thereby excluding that a circuit switched or a packet switched connection can be established. The attach reject message may still contain a limited amount of information for the communication module, e.g. a confirmation that the user data has been delivered to the data processing centre, thereby allowing the communication module to delete the user data and/or to avoid that the communication module makes further attempts to transmit the user data. The rejection of the attach request is advantageous for saving power in the communication module and saving resources in the telecommunications network.

In the specific context of M2M communications networks, it is not required to execute all procedures generally required for commercial mobile communications, thereby saving network resources. In particular, authentication procedures of the communication module in the telecommunications network may be omitted and left to the data processing centre recognizing and authenticating the communication module, e.g. on the basis of an application identifier or a device identifier. Also, the normal and period location updating procedures may be omitted provided that the communication module remains at a substantially stationary location (e.g. within the area served by a particular MSC or SGSN).

At least a part of the user data may be contained in the signalling message in encrypted form. Since the user data are to be transmitted to the telecommunications network as soon as possible, thereby not allowing time to establish a secure connection, it is advantageous to scramble or encrypt the user data in the communication module before insertion in the signalling message.

In an embodiment of the invention, the user data contained in the signalling message comprises addressing information indicative of the data processing centre to which the user data should be transferred. The addressing information may be shortened (e.g. using an application identifier instead of the address of the data processing centre) in order to save space in the signalling message for user data. The telecommunications network may be provided with functionality to derive the full address information of the data processing centre from the shortened address information.

The user data may be transferred to the data processing centre from the (node of the) telecommunications network by any available means. Advantageous embodiments include SMS or XML.

Hereinafter, embodiments of the invention will be described in further detail. It should be appreciated, however, that these embodiments may not be construed as limiting the scope of protection for the present invention.

DETAILED DESCRIPTION OF THE DRAWINGS

Figure 1:
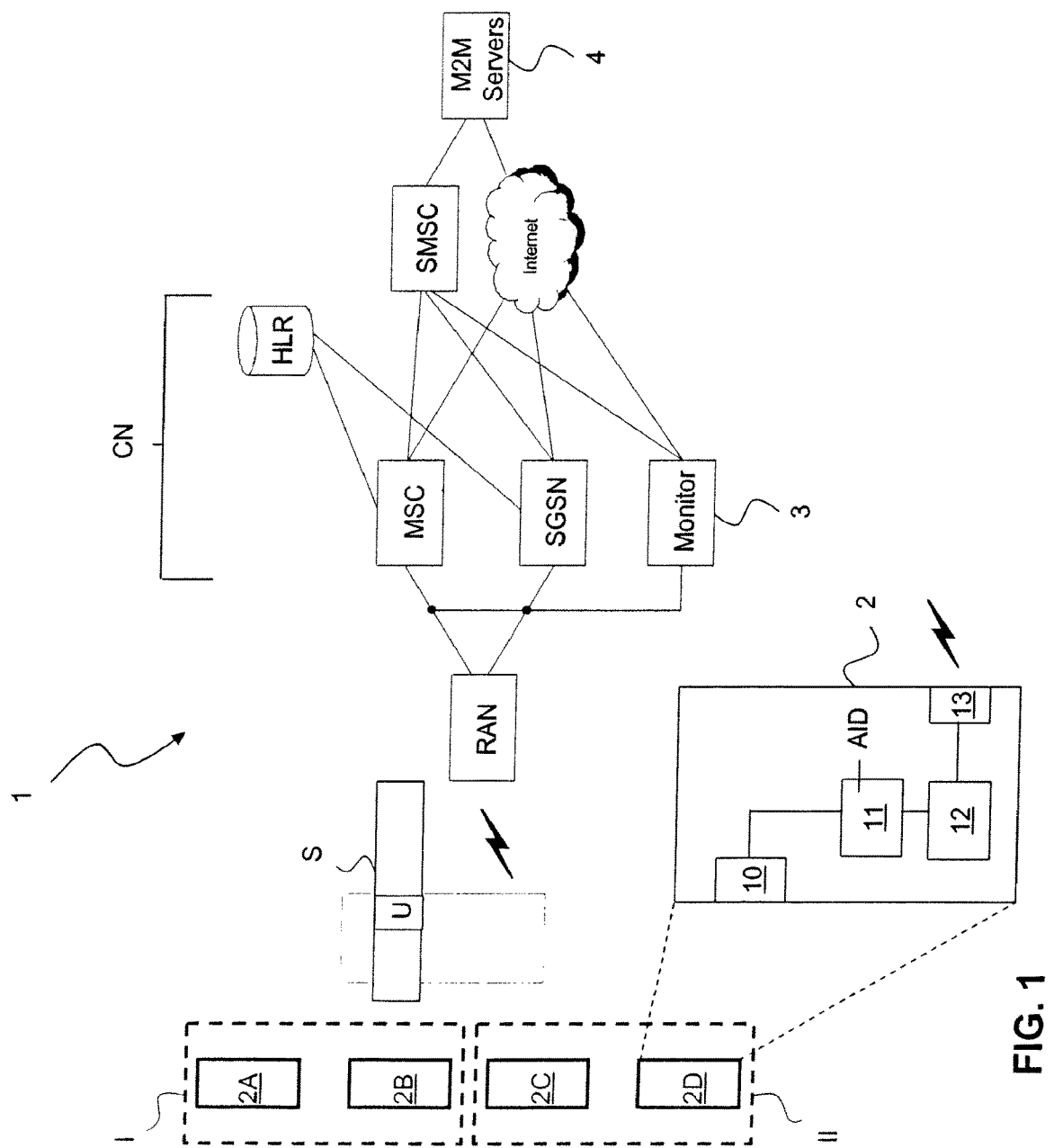
FIG. 1 shows a schematic illustration of a system for transmitting data in a machine-to-machine communication system according to an embodiment of the invention.

FIG. 1 shows a schematic illustration of a machine-to-machine (M2M) system 1 comprising a plurality of communication modules 2A-2D. Mobile communication modules 2A, 2B are exploited by a first organization I and may be used to monitor vehicles of a logistic fleet of vehicles to provide alarm in case of emergency. Substantially stationary communication modules 2C, 2D are exploited by a second organization II and may, for example, be used for communicating alarming user data of facilities to a data processing centre 4 for security purposes.

M2M system 1 comprises a telecommunications network with a Radio Access Network RAN and a Core Network CN, the core network CN containing a mobile switching centre MSC and a serving GPRS support node SGSN connected to a Home Location Register HLR as known to the person skilled in the art. A monitoring module 3 may be provided configured for sniffing signalling messages exchanged between the RAN and the CN as will be described in further detail with reference to FIG. 4.

The MSC, SGSN and monitoring module 3 of the telecommunications network are configured for transferring the user data to data processing centres 4, also referred to as M2M servers, of organizations I and II, respectively. As illustrated in FIG. 1, the user data may be provided to the M2M servers 4 using a Short Message Service Centre (SMSC) for sending the user data received from communication modules 2A-2D by SMS or by using the internet for transferring the user data in, e.g., XML messages.

As illustrated in FIG. 1, a communication module 2 comprises or is communicatively connected to a sensor 10. Sensor 10 monitors operation and/or receives data of a device or other instance, such as a room, and provides data to a processor 11. Processor 11 is configured for running one or more computer programs (e.g. an application identified by an application identifier AID) receiving the data from sensor 10. The data obtained from the sensor 10 may be processed in the communication module 2 before it is ready to be transmitted to the appropriate M2M server 4. An example of such processing includes encrypting the data, but other forms of processing the (raw) data are possible as well. Communication module 2 comprises an encapsulation module 12 (possibly software running on processor 11) for inserting the, possibly processed, user data U from the sensor 10 in signalling messages S. A transmitter 13 is provided for wirelessly transmitting the signalling messages S containing the user data U to the telecommunications network as schematically illustrated in FIG. 1. Such signalling messages S typically occur upon powering on the transmitter 13.

The user data U, apart from the data derived from the sensor 10, also contains address information indicating the data processing centre 4 to which the user data U should be transferred. Of course, the user data U may comprise a complete address of the appropriate data processing centre 4 that can be used in the telecommunications network for deciding where to transfer the user data U. The address information is stored in the communication module 2. In this manner user data U from communication modules 2A, 2B can be transferred to a data processing centre 4 of organization I, whereas user data U from communication modules 2C, 2D can be transferred to data processing centre 4 of organization II.

However, more advanced methods of addressing may be used, including, but not limited to, the use of identifiers (such as the application identifiers AID), for signalling the destination address of the user data U. The use of such (shorter) identifiers provides enhanced space in the signalling message S for the actual data. The telecommunications network should then comprise functionality for deriving the actual destination address of the appropriate data processing centre 4 from the received identifier. As an example, the identifier may be retrieved from the signalling message S in the telecommunications network and matched against a database or a query may be sent to a server (e.g. a DNS-type of server) having available the actual address of the data processing centre 4. The result of this process is then used for transferring the user data U to the data processing centre 4 via the SMSC or the internet.

Several embodiments of operating the M2M system 1 of FIG. 1 will be described below with reference to FIGS. 2A-2B (for circuit switched (CS) data transmission), FIGS. 3A-3B (for packet switched (PS) data transmission) and FIG. 4 (illustrating an embodiment using monitoring module 3). It should be appreciated, however, that many alternative embodiments can be envisaged within the scope of the present invention.

The general operation of the system of FIG. 1 involves the telecommunications network to wirelessly receive a signalling message S from the communication module 2. The signalling message S comprises user data U. The user data U is transferred to data processing centre 4. The user data U is retrieved from the received signalling message S within the telecommunications network and transferred further to data processing centre 4. The signalling message S can be a network attach request message in order to provide rapid transfer of the user data.

In case of a GSM/GPRS/UMTS telecommunications network the following types of Attach Request messages can be used. An IMSI or CS Attach Request message can be sent to the MSC in order to obtain CS services. Alternatively, a GPRS or PS attach request message can be sent to the SGSN in order to obtain PS services. Also a combined PS/CS Attach Request message can be sent to the SGSN in order to obtain both PS and CS services.

Depending on the type of Attach Request message used by the communication module 2, the user data is sent to the MSC or the SGSN. In case of IMSI attach the user data is received by the MSC and in case of GPRS attach or Combined attach the user data is received by the SGSN. The MSC or SGSN extracts the user data from the received Attach Request message and sends the user data to the data processing centre 4. To do so, the MSC/SGSN can use different means (SMS, Internet) to send the user data to the data processing centre 4.

The attach request of the communication unit 2 to the telecommunications network may or may not be accepted.

Figure 2A:
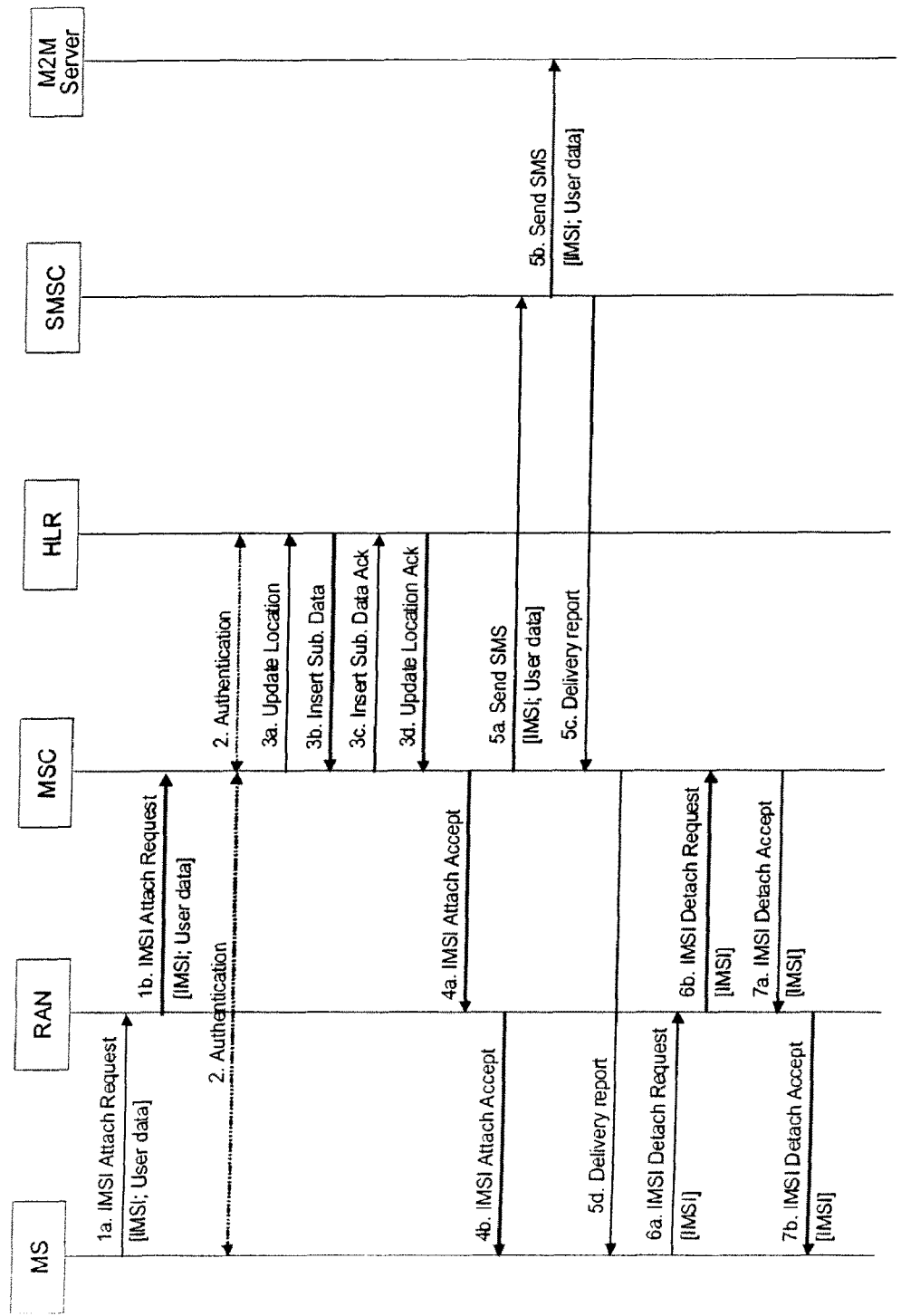
FIGS. 2A and 2B provide flow charts indicative of circuit-switched methods according to embodiments of the invention.

FIG. 2A provides an embodiment for circuit switched (CS) data wherein the attach request is accepted. After accepting the attach request, the encapsulated user data U is transferred by the MSC to data processing centre 4 by SMS followed by a detach procedure initiated by the communication module 2.

In the first step, the communication module 2 initiates the attach procedure to inform the telecommunications network it wants to access CS services and uses the capability to insert user data by the transmission of an Attach Request [IMSI, User data] message. The communication module 2 sends an IMSI Attach Request [IMSI, User data] message to RAN. The RAN conveys this message transparently to the MSC.

In particular, the communication module 2 may send a location updating request to request IMSI attach as specified in subclause 9.2.15 of 3GPP TS 24.008 V8.3.0, indicating that the communication module 2 has become active for the telecommunications network. IMSI attach can be requested by having the location updating type information element to code for IMSI attach as specified in subclause 10.5.3.5 of the same document. Use of the IMSI attach avoids the need to store or have stored communication module specific information in the MSC (or the visitor location register VLR, not shown in FIG. 1), thereby saving resources.

In the second step, the authentication procedure is executed in order to identify the communication module 2.

In the third step, the MSC informs the HLR about the number (address) of the MSC where the communication module 2 is located. The MSC sends an Update Location containing the MSC address to the HLR. The HLR sends Insert Subscriber Data containing subscriber information to the MSC. The MSC then validates the presence of the communication module 2. If all checks are successful, the MSC provides a mobility management (MM) context for the communication and returns an Insert Subscriber Data Acknowledgement message to the HLR. The HLR acknowledges the Update Location message by sending an Update Location acknowledgement message to the MSC after the MM context is finalized.

In the fourth step, the MSC sends an Attach Accept message to the communication module 2 as response to the IMSI Attach Request in step 1 to complete the attach procedure. The MSC sends an Attach Accept message to RAN. The RAN conveys this message transparently to the communication module 2.

Then, in the fifth step, the MSC extracts the user data U received in the IMSI Attach Request message and constructs a SMS using the address information for the appropriate data processing centre 4 requiring the user data U. As mentioned previously, the actual address information may also be derived in the telecommunications network using an identifier in the signalling message S. The MSC sends the SMS containing IMSI (for identifying the communication module) and application data to the SMSC. If the communication module does not have a SIM (and thus no IMSI), another identifier, such as the IMEI number, may be used. The SMSC sends the SMS to the data processing centre 4. The SMSC, after having sent the SMS to the data processing centre 4, sends a delivery report to the MSC. The delivery report is sent by the MSC to the communication module 2 via the RAN using e.g. SMS.

Subsequently, in a sixth step, the communication module 2 starts a detach procedure to inform the network it no longer wants to access the CS services. The communication module 2 sends an IMSI Detach Request message to RAN and the RAN conveys this message transparently to the MSC.

Finally, in a seventh step, the MSC responds with an IMSI Detach Accept message to the communication module 2. The MSC sends an IMSI Detach Accept message to RAN. The RAN conveys this message transparently to the communication module 2.

It should be noted that, specifically in the context of an M2M system 1, several steps in the network can be omitted. As an example, the identification and authentication procedure of the communication module 2 in the telecommunications network may be omitted and left to the data processing centre 4 recognizing and authenticating the communication module, e.g. on the basis of the application identifier AID or a device identifier, such as the IMEI. Also, the normal and period location updating procedures may be omitted provided that the communication module remains at a substantially stationary location (e.g. within the area served by a particular MSC), as may be the case for the stationary communication modules 2C, 2D of organization II.

Authentication may also be omitted by using pre-provisioned access numbers as explained in the non-published patent application EP08009899.9 of the present applicant. A connection request containing these numbers is recognized in the telecommunications network 6 as a request for which authentication should be omitted. Such a number may also be used for determining the destination address of the data processing centre 4 in a manner explained in the same application.

Figure 2B:
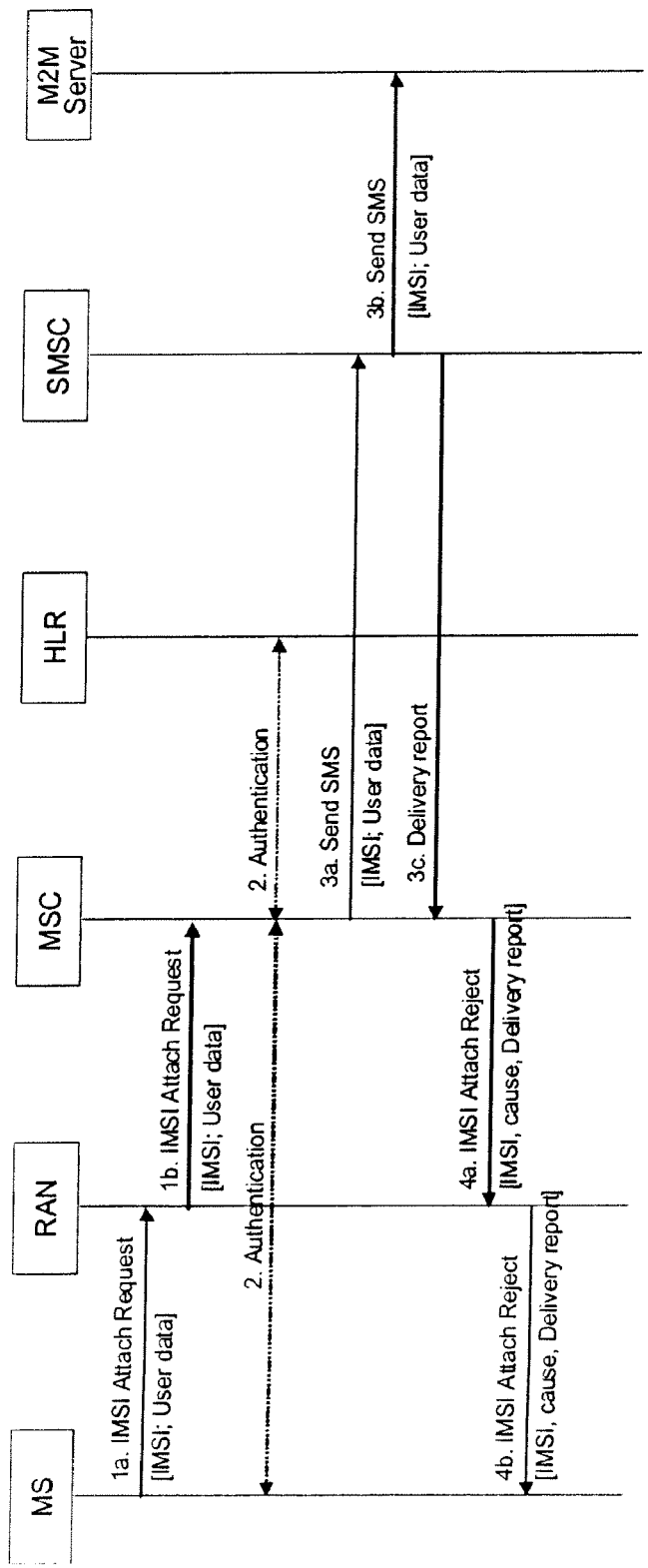

FIG. 2B provides an embodiment for circuit switched data (now denying the attach request) wherein the location updating process is omitted and the attach procedure is aborted, thereby saving power for communication module 2 and saving resources in the network. The user data U is encapsulated in the Attach Request message and transferred by the MSC to data processing centre 4 by SMS followed by an Attach Reject message from the telecommunications network to the communication module 2.

In the first step, the communication module 2 initiates the attach procedure to inform the network it wants to access CS services and uses the capability to insert user data U by the transmission of an Attach Request [IMSI (or IMEI), User data] message. The communication module 2 sends an IMSI Attach Request [IMSI, User data] message to the RAN. The RAN conveys this message transparently to the MSC.

In the second step authentication is performed.

In the third step, the MSC extracts the user data U received in the IMSI Attach Request message and constructs an SMS message using the address information of the data processing centre 4 and the application data contained in the user data U and sends the SMS. The MSC sends the SMS containing IMSI (or IMEI) and application data to the SMSC. The SMSC sends the SMS to the M2M Server. The SMSC after having sent the SMS to the M2M Server sends a delivery report to the MSC.

Then, in a final step, the MSC sends an IMSI Attach Reject message to the communication module 2 in response to the IMSI Attach Request in step 1. This message is specified in subclause 9.2.14 of 3GGP TS 24.008, V.8.3.0 as Location updating reject, which message is sent by the network to the communication module to indicate that IMSE attach has failed. The MSC sends an IMSI Attach Reject message to RAN. The RAN conveys this message transparently to the communication module 2.

Figure 3A:
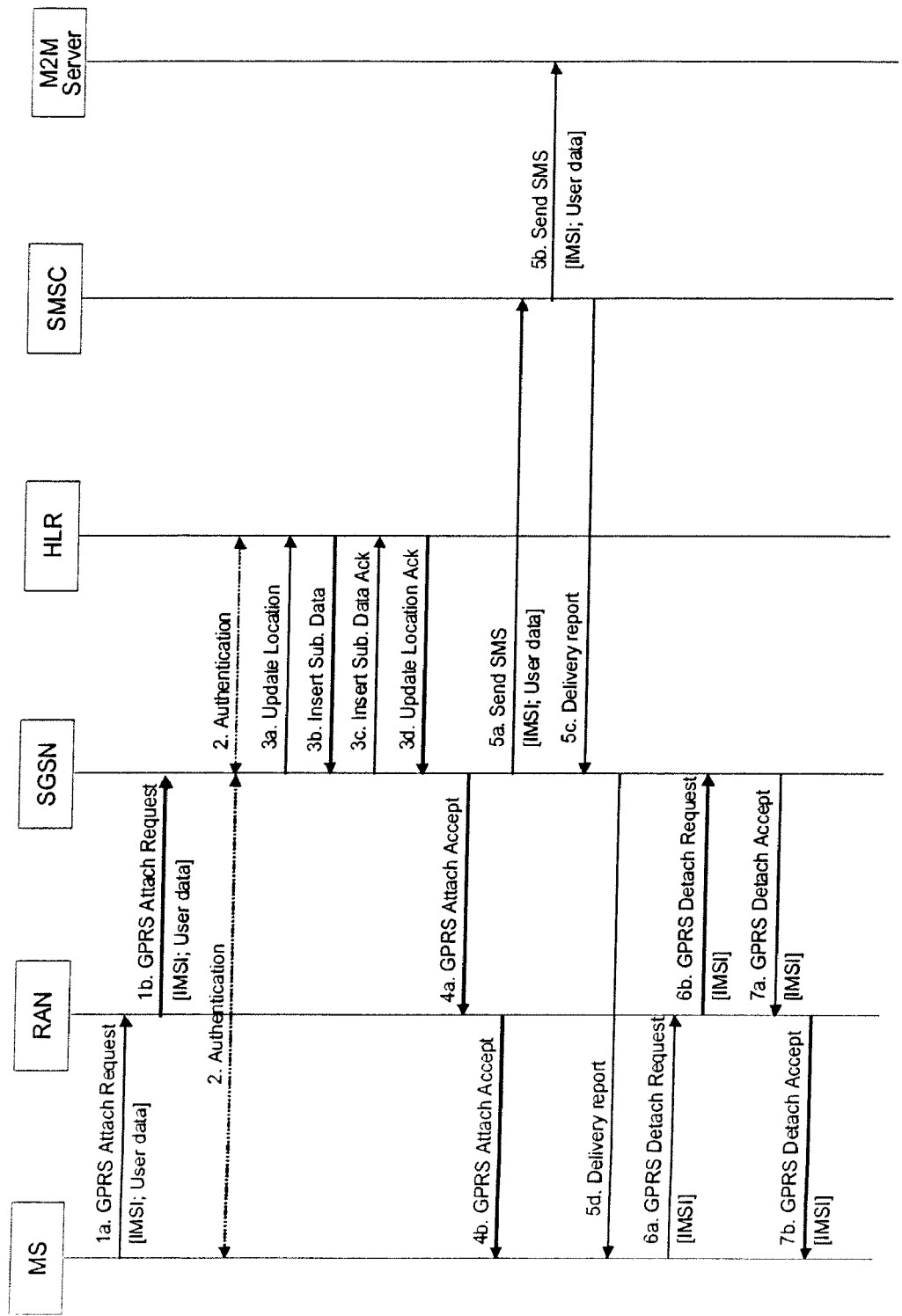
FIGS. 3A and 3B provide flow charts indicative of packet-switched methods according to further embodiments of the invention.

FIG. 3A provides an embodiment for packet switched (PS) data wherein the attach request is accepted. After accepting the attach request, the encapsulated user data U is transferred by the MSC to data processing centre 4 by SMS followed by a detach procedure initiated by the communication module 2.

In a first step, the communication module 2 initiates the attach procedure to inform the network it wants to access PS services and uses the capability to insert user data U by the transmission of an Attach Request [IMSI (or IMEI), User data] message. The communication module 2 sends a GPRS Attach Request [IMSI, User data] message to RAN. The RAN conveys this message transparently to the SGSN.

In particular, the communication module 2 may send an Attach Request as specified in subclause 9.4.1 of 3GPP TS 24.008 V8.3.0, indicating that the communication module 2 has become active for the telecommunications network, in order to perform a GPRS attach or a Combined GPRS attach. The GPRS attach or the Combined GPRS attach can be requested by having the Attach type information element to code for GPRS or Combined GPRS attach as specified in subclause 10.5.5.2 of the same document.

In the second step, the authentication procedure is executed in order to identify the communication module 2.

In the third step, the SGSN informs the HLR about the number (address) of the SGSN where the communication module 2 is located. The SGSN sends an Update Location containing the SGSN address to the HLR. The HLR sends Insert Subscriber Data containing subscriber information to the SGSN. The SGSN then validates the presence of the communication module 2. If all checks are successful, the MSC provides a mobility management (GMM) context for the communication and returns an Insert Subscriber Data Acknowledgement message to the HLR. The HLR acknowledges the Update Location message by sending an Update Location acknowledgement message to the SGSN after the GMM context is finalized.

In a fourth step, the SGSN sends an Attach Accept message to the communication module 2 in response to the GPRS Attach Request in step 1. The SGSN sends an Attach Accept message to RAN. The RAN conveys this message transparently to the communication module 2.

Then, in a fifth step, the SGSN extracts the user data U received in the GPRS Attach Request message and constructs a SMS using the address information of the data processing centre 4 and the application data contained in the user data and sends the SMS to the data processing centre 4. As mentioned previously, the actual address information may also be derived in the telecommunications network using an identifier in the signalling message S. The SGSN sends the SMS containing IMSI (or IMEI) and application data to the SMSC. The SMSC sends the SMS to the data processing centre 4. The SMSC, after having sent the SMS to the data processing centre 4, sends a delivery report to the SGSN. The delivery report is sent by the SGSN to the communication module 2 via the RAN using e.g. SMS.

Subsequently, in a sixth step, the communication module 2 starts a detach procedure to inform the network it no longer wants to access the PS services. The communication module 2 sends an IMSI Detach Request message to RAN and the RAN conveys this message transparently to the SGSN.

Finally, in a seventh step, the SGSN responds with an IMSI Detach Accept message to the communication module 2. The SGSN sends an IMSI Detach Accept message to RAN. The RAN conveys this message transparently to the communication module 2.

Figure 3B:
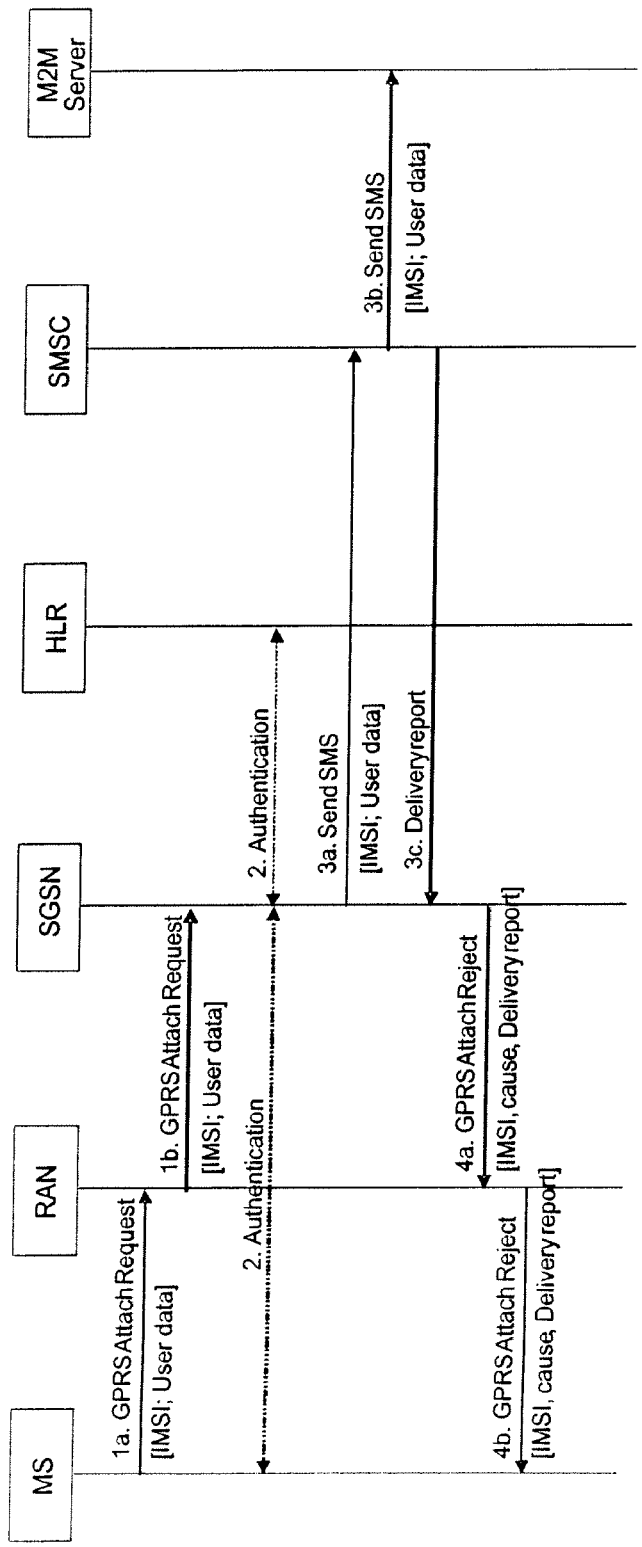

Again, as for the CS embodiment of FIGS. 2A and 2B, in the specific M2M context, several steps in the embodiment of FIG. 3A may be omitted, as illustrated in FIG. 3B.

FIG. 3B provides an embodiment for packet switched data (now denying the attach request) wherein the location updating process is omitted and the attach procedure is aborted, thereby saving power for communication module 2 and saving resources in the network. The user data U is encapsulated in the Attach Request message and transferred by the MSC to data processing centre 4 by SMS followed by an Attach Reject message from the telecommunications network to the communication module 2.

Again, in a first step, the communication module 2 initiates the attach procedure to inform the network it wants to access PS services and uses the capability to insert user data by the transmission of an Attach Request [IMSI, User data] message. The communication module 2 sends a GPRS Attach Request [IMSI, User data] message to the RAN. The RAN conveys this message transparently to the MSC.

In the second step, the authentication procedure is executed in order to identify the communication module 2.

In the third step, the SGSN extracts the user data U received in the GPRS Attach Request message and constructs an SMS using the address information of the data processing centre 4 and the application data contained in the user data and sends the SMS to the data processing centre 4. The SGSN sends the SMS containing IMSI and application data to the SMSC. The SMSC sends the SMS to the data processing centre 4. The SMSC after having sent the SMS to the data processing centre 4 sends a delivery report to the SGSN.

Finally, in the fourth step, the SGSN sends a GPRS Attach Reject message to the communication module 2 in response to the GPRS Attach Request in step 1. The SGSN includes the delivery report as a parameter in the GPRS Attach Reject message. The cause of the rejection may be specified or an existing cause may be used that is interpreted by the communication unit as an acknowledgement. The SGSN sends a GPRS Attach Reject message to RAN. The RAN conveys this message transparently to the MS.

Figure 4:
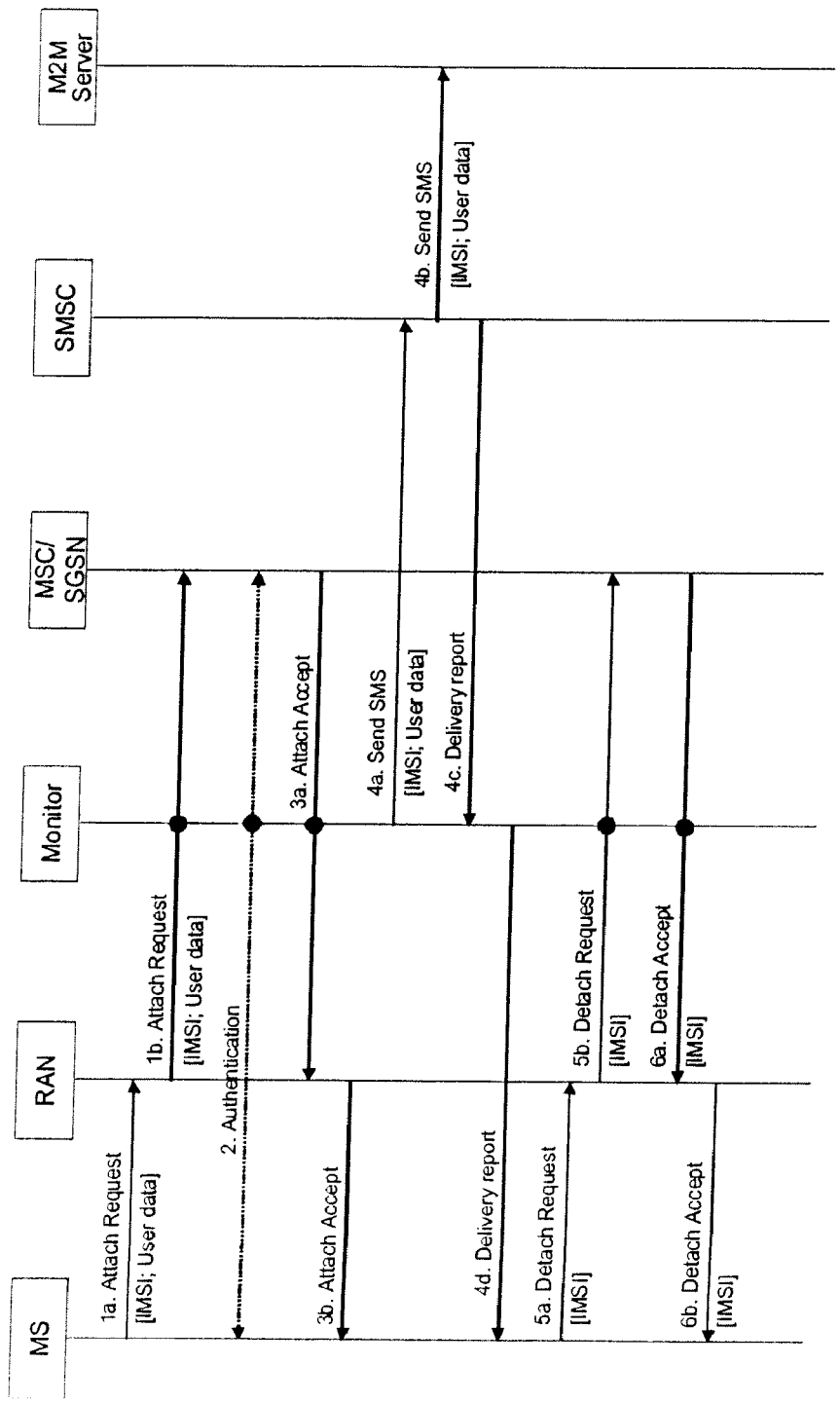
FIG. 4 provides a flow chart indicative of a method according to a still further embodiment of the invention.

The embodiment of the invention as depicted in FIG. 4 provides the option of intercepting and extracting the user data U from signalling messages S exchanged between the RAN and the CN, in particular between the RAN and the MSC/SGSN, to avoid modification of the MSC/SGSN. These signalling messages are described in detail in 3GGP TS 48.008 (for GSM), 3GGP 48.014, 48.016 and 48.018 (for GPRS), 3GPP TS 25.41x (for UMTS circuit switched and packet switched. The embodiment can use either IMSI attach, GPRS attach or Combined GPRS/IMSI attach and is therefore referred to simply as attach in FIG. 4.

In a first step, the communication module 2 initiates the attach procedure to inform the network it wants to access CS, PS or both services and uses the capability to insert user data by the transmission of an Attach Request [IMSI, User data] message. The communication module 2 sends an Attach Request [IMSI, User data] message to RAN. The RAN conveys this message transparently to the MSC. This message containing the user data is also received by the monitoring module 3.

In a next step, the authentication functions are performed as there exists no Mobility Management (MM) context for the communication module 2. The monitoring module 3 is or becomes aware of the outcome of the authentication procedure.

Then, the MSC/SGSN sends an Attach Accept message to the communication module 2 in response to the Attach Request in step 1. The MSC/SGSN sends an Attach Accept message to RAN. This message is also received by the monitoring module 3 and is an indication for the monitoring module to proceed with step 4. The RAN conveys this message transparently to the communication module 2. The same effect can be obtained using an Attach Reject message. Also, the cause of the Attach reject message may be interpreted by the communication unit 2 as an acknowledgement message.

In the fourth step, the monitoring module 3 extracts the user data U received in the monitored Attach Request message and constructs an SMS using the address information of the data processing centre 4 and the application data contained in the user data and sends the SMS to the data processing centre 4. The monitoring module sends the SMS containing IMSI (or IMEI) and application data to the SMSC. The SMSC sends the SMS to the data processing centre 4. The SMSC, after having sent the SMS to the data processing centre 4, sends a delivery report to the monitoring module 3. The delivery report is sent by the monitoring module 3 to the communication module 2 via the RAN.

Subsequently, the communication module 2 starts a detach procedure to inform the network it no longer wants to access the services. The communication module 2 sends a Detach Request message to RAN. The RAN conveys this message transparently to the MSC. This message is also received by the monitoring module 3.

Finally, the MSC/SGSN responds with a Detach Accept message to the communication module 2. The MSC/SGSN sends a Detach Accept message to RAN. This message is also received by the monitoring module 3 and is an indication for the monitoring module 3 to stop the process. The RAN conveys this message transparently to the MS.

The invention claimed is:

1. A method of transferring data from a communication module to a data processing centre over a telecommunications network, the method comprising:
   receiving a wireless signalling message from the communication module, the received wireless signalling message containing non-signalling application data generated for a machine-to-machine function, wherein the wireless signalling message is of a message type specified for carrying signalling data in the telecommunications network; and
   transferring the non-signalling application data to the data processing centre,
   wherein the telecommunications network is configured for retrieving the non-signalling application data from the received wireless signalling message, while avoiding to establish a complete circuit-switched or packet-switched connection between the communication module and the telecommunications network.

2. The method according to claim 1, further comprising:
   retrieving the non-signalling application data from the received wireless signalling message in the telecommunications network.

3. The method according to claim 2, wherein the wireless signalling message is a network attach request message.

4. The method according to claim 3, wherein the network attach request message is a location updating request message with a location updating type information element indicating an IMSI attach.

5. The method according to claim 3, wherein the network attach request message is an attach request with an attach type information element indicating one of a GPRS request or a combined GPRS/IMSI attach.

6. The method according to claim 3, further comprising:
   transmitting a network attach accept message to the communication module;
   transmitting further data to and/or receiving further data from the communication module; and
   receiving a network detach message from the communication module.

7. The method according to claim 3, further comprising transmitting an attach reject message to the communication module, the attach reject message comprising data for the communication module.

8. The method according to claim 3, wherein the communication module is not authenticated in the telecommunications network.

9. The method according to claim 1 wherein normal location updating procedure is not performed in the communication module.

10. The method according to claim 1, wherein at least a part of the non-signalling application data is encrypted.

11. The method according to claim 1, wherein the received wireless signalling message contains address information indicative of the data processing centre.

12. The method according to claim 1, wherein the application data is transferred to the data processing centre using one or more SMS messages.

13. The method according to claim 1, wherein the application data is transferred to the data processing centre using one or more XML messages.

14. The method according to claim 1, wherein the non-signalling application data comprises alarming data.

15. The method according to claim 1, wherein the non-signalling application data comprises measurement data.

16. The method according to claim 15, wherein the communication module comprises one or more sensors, and wherein the measurement data comprises measurement data obtained using the one or more sensors.

17. The method according to claim 1, wherein the wireless signalling message is received prior to completing or aborting an attach procedure.

18. A telecommunications network for transferring data from a communication module to a data processing centre, the telecommunications network comprising:
one or more processors and program code that when executed by the one or more processors cause the one or more processors to carry out operations including:
receiving a wireless signalling message from the communication module, the received wireless signalling message containing non-signalling application data generated for a machine-to-machine function, wherein the wireless signalling message is of a message type specified for carrying signalling data in the telecommunications network; and
transferring the non-signalling application data to the data processing centre,
wherein the telecommunications network is configured for retrieving the non-signalling application data from the received wireless signalling message, while avoiding to establish a complete circuit-switched or packet-switched connection between the communication module and the telecommunications network.

19. The telecommunications network according to claim 18, wherein the wireless signalling message is received prior to completing or aborting an attach procedure.

20. A node in a telecommunications network, the telecommunications network being configured for transferring data from a communication module to a data processing centre, the node comprising:
one or more processors and program code that when executed by the one or more processors cause the node to carry out operations including:
receiving a wireless signalling message from the communication module, the received wireless signalling message containing non-signalling application data generated for a machine-to-machine function, wherein the wireless signalling message is of a message type specified for carrying signalling data in the telecommunications network; and
transferring the non-signalling application data to the data processing centre,
wherein the telecommunications network is configured for retrieving the non-signalling application data from the received wireless signalling message, while avoiding to establish a complete circuit-switched or packet-switched connection between the communication module and the telecommunications network.

21. The node according to claim 20, wherein the node is a Mobile Switching Centre.

22. The node according to claim 20, wherein the node is a serving GPRS support node.

23. The node according to claim 20, wherein the node is a signalling monitor.

24. The node according to claim 20, wherein the wireless signalling message is received prior to completing or aborting an attach procedure.

25. A communication device comprising (i) a processor for processing non-signalling application data of a program run by the communication device for a machine-to-machine function, (ii) an encapsulation module configured for encapsulating the non-signalling application data in one or more signalling messages from the communication device to a telecommunications network, wherein the one or more signalling messages are of a message type specified for carrying signalling data in the telecommunications network, and (iii) a transmitter configured for transmitting the signalling messages containing the non-signalling application data of the program run by the communication device to the telecommunications network,
wherein the transmitter is configured for transmitting the signalling messages containing the non-signalling application data to the telecommunications network, while avoiding to establish a complete circuit-switched or packet-switched connection between the communication device and the telecommunications network.

26. The communication device according to claim 25, wherein the non-signalling application data comprises alarming data.

27. The communication device according to claim 25, wherein the non-signalling application data comprises measurement data.

28. The communication device according to claim 27, further comprising one or more sensors, wherein the measurement data comprises measurement data obtained using the one or more sensors.

29. The communication device according to claim 25, wherein the one or more signalling messages are transmitted prior to completing or aborting an attach procedure.

* * * * *